Figure 1:
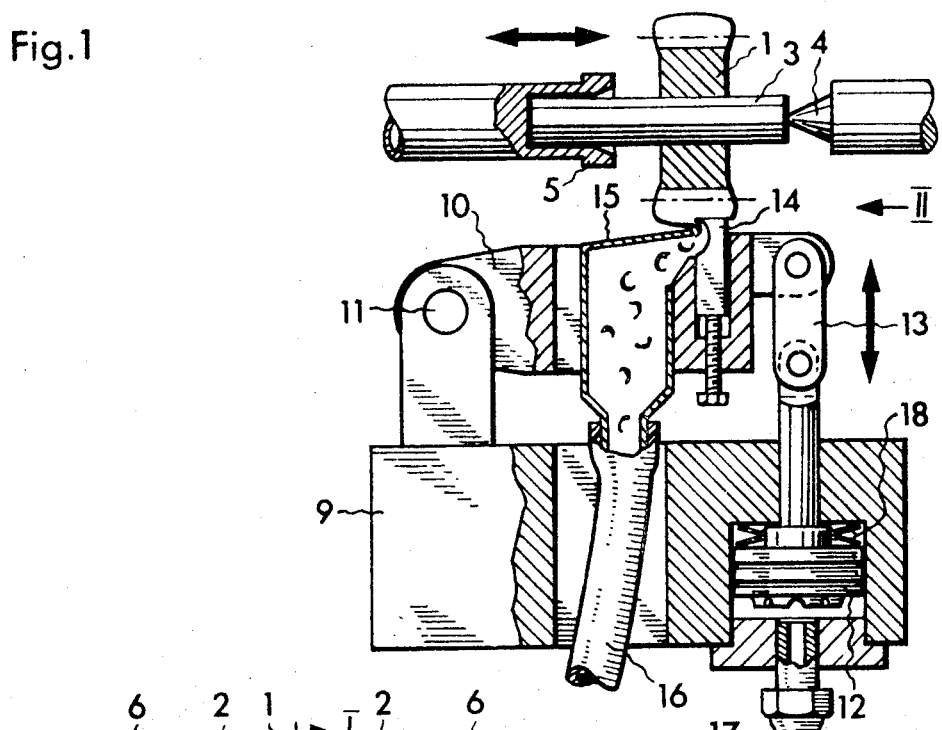

United States Patent [19]
Maag et al.

[11] 3,750,443
[45] Aug. 7, 1973

[54] GEAR ROLLING MACHINES

[75] Inventors: Oskar Maag; Otto Wenger, both of Zurich, Switzerland

[73] Assignee: Maag Gear Wheel & Machine Company Limited, Zurich, Switzerland

[22] Filed: Nov. 5, 1971

[21] Appl. No.: 195,921

[30] Foreign Application Priority Data
Nov. 6, 1970  Germany................... P 20 54 740.4

[52] U.S. Cl.......................... 72/72, 72/341, 90/1.6 R
[51] Int. Cl............................................... B21h 5/00
[58] Field of Search ................. 72/70, 72, 340, 341, 72/464, 102; 29/159.2; 90/1.4, 1.6

[56] References Cited
UNITED STATES PATENTS

| | | | |
|---|---|---|---|
| 3,631,704 | 1/1972 | Leonard et al. ...................... | 72/102 |
| 2,271,759 | 2/1942 | Christman.............................. | 72/70 |
| 2,787,195 | 4/1957 | Topolinski ............................. | 90/1.4 |

FOREIGN PATENTS OR APPLICATIONS

| | | | |
|---|---|---|---|
| 622,839 | 5/1949 | Great Britain..................... | 29/159.2 |

*Primary Examiner*—Lowell A. Larson
*Attorney*—David Toren and Bernard X. McGeady et al.

[57] ABSTRACT

A gear rolling machine has one or more cutting tools mounted in it to remove material upset to the periphery or end faces of a workpiece during the gear rolling operation, the material being removed while the workpiece is still rotatably mounted in its location in the machine for the rolling operation.

3 Claims, 2 Drawing Figures

GEAR ROLLING MACHINES

The invention relates to a gear rolling machine in which a rotating workpiece rolls on one or more rolling tools, that is to say a machine for cold-rolling a gear tooth system.

In machines of this kind which operate on the gear generating method with worm-form tools that perform axial motions relative to the workpiece (axial method), the material to be displaced is frequently upset beyond the desired tip circle and/or laterally beyond the desired tooth width. Hitherto this condition has been tolerated in the final product or the upset material was subsequently removed in a separate operation in which the workpiece was held in a lathe, a milling machine or shaving machine. Reclamping and additional machining involves time losses and increased expense, however. In some circumstances it also results in the accuracy being impaired, for example, due to the extra setting up.

It is an object of the present invention to permit such undesired upset material to be removed in the production of cold rolled gear wheels while at the same time avoiding any undue increase in working time and machinery costs.

According to the invention, in a gear rolling machine in which a workpiece engageable with at least one rolling tool is rotatable about its own axis, there is provided at least one cutting tool that is arranged to act on the workpiece to remove material therefrom while the workpiece is held in location for the gear rolling operation.

Figure 2:
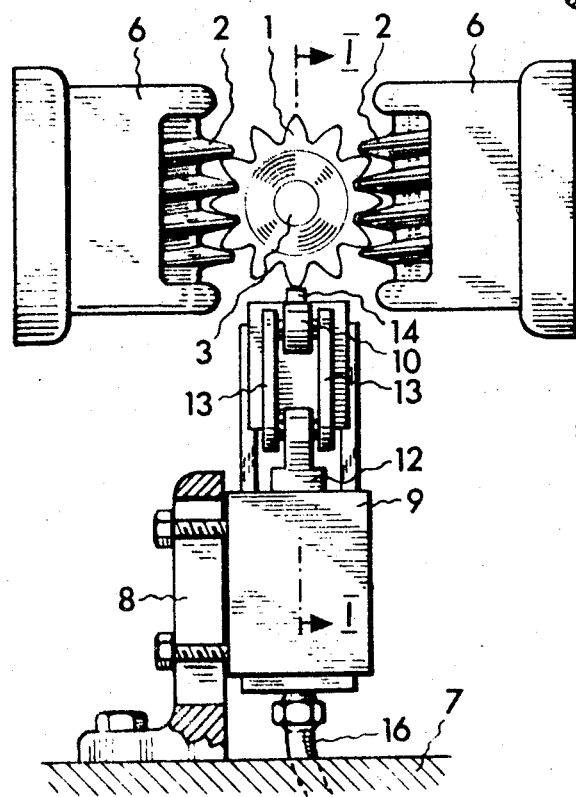
Figure 3:
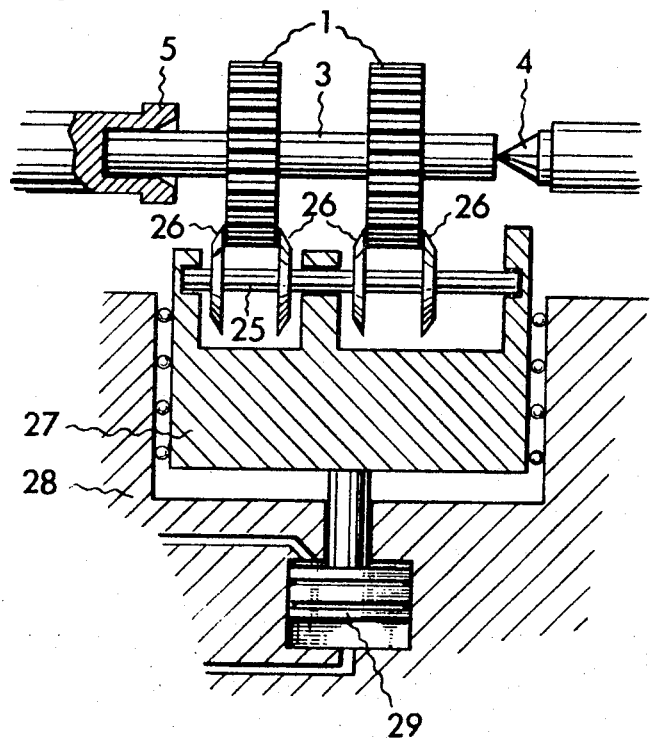
Figure 4:
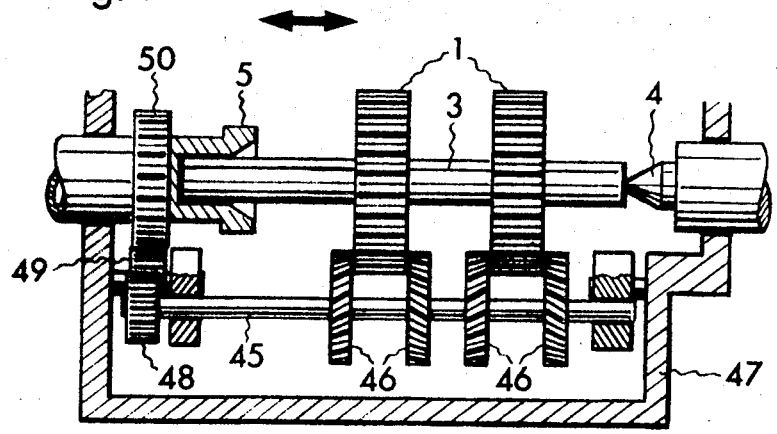
Figure 5:
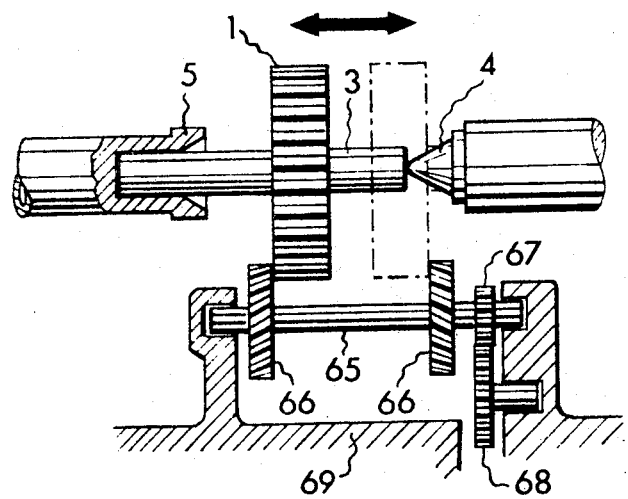
Figure 6:
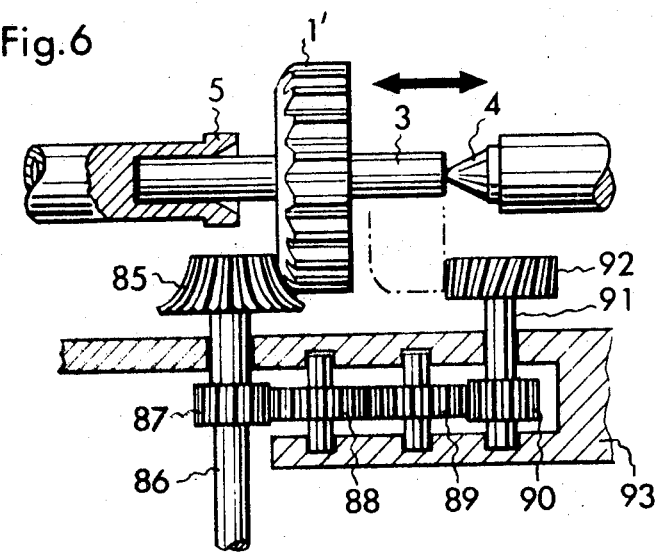

An embodiment of the invention is described hereinbelow by reference to the accompanying diagrammatic drawings in which:

FIG. 1 shows, as a section along the plane I—I of FIG. 2, part of a rolling machine according to the invention in which the workpiece is operated on in accordance with the axial method, and performs a reciprocating axial motion during cold rolling; and FIG. 2 is a view of part of the same machine seen in the direction of the arrow II of FIG. 1, that is to say axially of the workpiece.

The gear rolling machine illustrated in FIGS. 1 and 2 produces a tooth system on a workpiece 1 in the cold state by means of two worm-form tools 2 using the generating method, for example in accordance with pending U.S. patent application Ser. No. 70,377 (A. Meyer, O. Wenger and O. Maag) the workpiece performing an axially reciprocating motion while the two worm-form tools are fed in towards it for forming the tooth gaps and for the subsequent finishing of the tooth profiles.

The workpiece 1 is non-rotatably secured to a mounting mandrel 3 which is clamped between a centre 4 and a driving engagement 5 from which the axially reciprocating motion is imparted to it relative to the two worm-form tools 2. The tools 2 are supported in tool carriers 6. An angle bracket 8 is mounted on machine bed 7 and has a cutter unit 9 bolted to it in a vertically adjustable manner. An arm 10 of the unit 9 is arranged to pivot about an axis 11 and the position of the arm is defined by a piston 12, connected to said arm by means of links 13. A single point cutter tool 14 is adjustably mounted on the arm 10. A suction head 15, connected to a suction pipe 16 is provided to collect the swarf produced by the tool so that the swarf is drawn off together with the coolant, which flushes the workpiece 1 at the point at which its gear form is being generated, and swarf and coolant do not therefore interfere with the rolling operation.

The piston 12 may have pressure fluid, e.g. hydraulic liquid, acting on its underside, the fluid being supplied by means of a duct 17 and the supply being controlled so that the piston moves between its upper and lower limiting positions in synchronism with the axial reciprocating motion of the workpiece 1. Motion to the lower limiting position is produced by return springs 18 which are compressed by the piston in its upper limiting position. During the motion of the workpiece 1 from left to right the piston 12 and therefore the tool 14 assume their upper limiting position at which material will be removed from the tips of the workpiece teeth. During the return motion of the workpiece from right to left the the tool will assume its lower limiting position in which it is held spaced from the workpiece. Since the material is only gradually upset during the rolling operation, the chips cut will not be very large even if the tool 14 assumes its final upper limiting position from the beginning of the process in order to machine the tip surfaces of the teeth in the longitudinal direction thereof, although it is also possible to increase the upward movement of the tool in stages.

While for clarity of explanation the foregoing example has illustrated the trimming of a workpiece tip circle or side faces as alternatives, it will be appreciated that in practice it may be arranged that both these actions should be performed jointly on the same machine.

What we desire to secure by Letters Patent is:

1. In a gear rolling machine in which a workpiece is engageable with at least one gear rolling tool and is rotatable about its own axis, the improvement consisting of at least one cutting tool mounted on the machine to act on the workpiece to remove material therefrom while the workpiece is held in its rolling operating location, means provided to produce relative reciprocating displacement between the workpiece and said at least one rolling tool axially of the workpiece, a mounting for said at least one cutting tool comprising a member displaceably held in the machine, means for displacement of said member so that said at least one cutting tool is reciprocated substantially radially relative to the workpiece while said relative displacement between the workpiece and said at least one rolling tool causes relative axial movement also between the workpiece and said at least one cutting tool, said reciprocation of said at least one cutting tool radially of said workpiece taking place synchronously with said relative axial movement whereby said at least one cutting tool is displaced transversely away from the workpiece during the return stroke of said relative axial movement.

2. A gear rolling machine according to claim 1 wherein said means for radial displacement of said at least one cutting tool comprises a fluid-pressure ram.

3. A gear rolling machine according to claim 1 wherein said at least one cutting tool is a single point tool acting on the tooth tip surfaces of the workpiece.

* * * * *